United States Patent
Rickenbach et al.

(12)

(10) Patent No.: US 11,860,020 B2
(45) Date of Patent: Jan. 2, 2024

(54) INTAKE ARRANGEMENT FOR A ROLLER MILL, ROLLER MILL HAVING SUCH AN INTAKE ARRANGEMENT AND METHOD FOR DETERMINING THE GROUND MATERIAL FILL LEVEL OF A STORAGE CONTAINER OF A ROLLER MILL

(71) Applicant: BÜHLER AG, Uzwil (CH)

(72) Inventors: Daniel Rickenbach, Wittenwil (CH); Daniel Fischer, Schwellbrunn (CH); Dimitrios Marinos, Glattpark (CH)

(73) Assignee: Bühler AG, Uzwil (CH)

(*) Notice: Subject to any disclaimer, the term of this patent is extended or adjusted under 35 U.S.C. 154(b) by 212 days.

(21) Appl. No.: 17/263,982

(22) PCT Filed: Jul. 31, 2019

(86) PCT No.: PCT/EP2019/070644
§ 371 (c)(1),
(2) Date: Jan. 28, 2021

(87) PCT Pub. No.: WO2020/025681
PCT Pub. Date: Feb. 6, 2020

(65) Prior Publication Data
US 2021/0302217 A1 Sep. 30, 2021

(30) Foreign Application Priority Data
Jul. 31, 2018 (EP) .................................... 18186666

(51) Int. Cl.
*G01F 23/20* (2006.01)
*B02C 4/28* (2006.01)
*G01F 25/00* (2022.01)

(52) U.S. Cl.
CPC .............. *G01F 23/20* (2013.01); *B02C 4/286* (2013.01); *G01F 25/0092* (2013.01)

(58) Field of Classification Search
None
See application file for complete search history.

(56) References Cited

U.S. PATENT DOCUMENTS 4,169,543 A * 10/1979 Hall ..................... G01F 23/26
222/64
4,619,408 A * 10/1986 Sangati ................... B02C 25/00
241/37

(Continued)

FOREIGN PATENT DOCUMENTS

| CN | 200996852 Y | 12/2007 |
| RU | 2 537 099 C1 | 11/2014 |
| WO | 95/14217 A1 | 5/1995 |

OTHER PUBLICATIONS

Russian Office Action Corresponding to 2021103659 dated Aug. 27, 2021.

(Continued)

*Primary Examiner* — Paul M. West
*Assistant Examiner* — Mark A Shabman
(74) *Attorney, Agent, or Firm* — Finch & Maloney PLLC

(57) ABSTRACT

An intake arrangement (1) for a roller mill which includes a storage container (2), a force transducer (6) arranged on the storage container (2), a level sensor (7) arranged on the storage container (2) for determining when a ground material level (B) is reached in the storage container (2), and a control unit (8). The control unit (8) is designed to determine a first fill level (A) of the storage container (2), from a weight force (EG) determined by the force transducer (6), and to determine a characteristic fill level curve (K), based on the determined first fill level (A) and the fill level (B) determined by the level sensor (7).

13 Claims, 1 Drawing Sheet

(56) References Cited

U.S. PATENT DOCUMENTS

Figure 1:
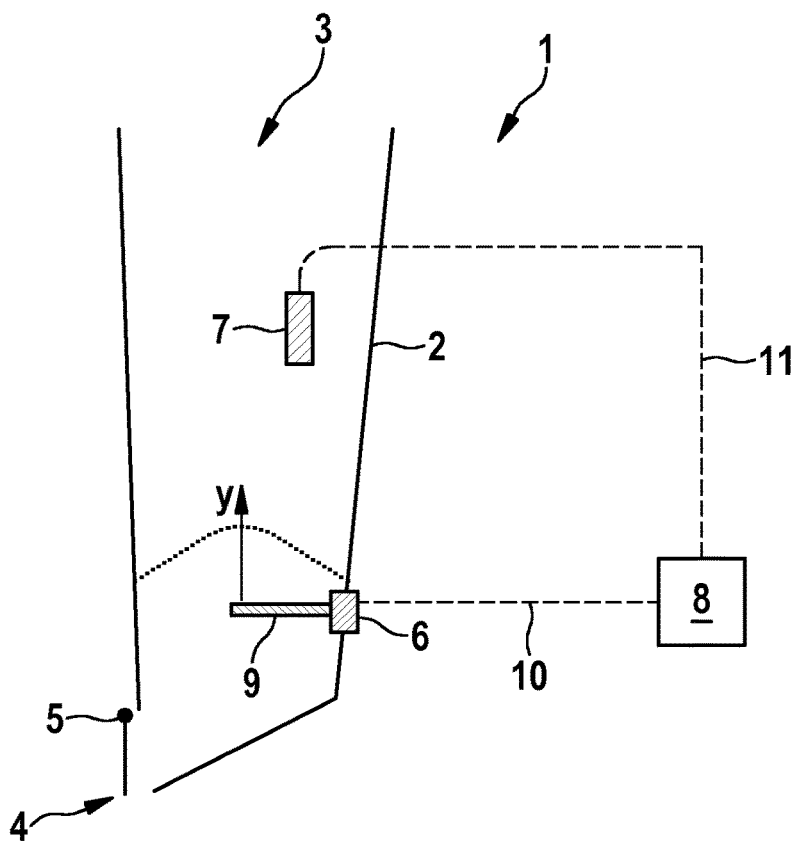

| | | | |
|---|---|---|---|
| 5,433,391 A | 7/1995 | Jagger et al. | |
| 6,502,773 B1* | 1/2003 | Hostettler | B02C 4/286 |
| | | | 241/34 |
| 2016/0067713 A1* | 3/2016 | Okamoto | G01F 23/20 |
| | | | 241/225 |

OTHER PUBLICATIONS

International Search Report Corresponding to PCT/EP2019/070644 dated Sep. 26, 2019.
Written Opinion Corresponding to PCT/EP2019/070644 dated Sep. 26, 2019.

* cited by examiner

INTAKE ARRANGEMENT FOR A ROLLER MILL, ROLLER MILL HAVING SUCH AN INTAKE ARRANGEMENT AND METHOD FOR DETERMINING THE GROUND MATERIAL FILL LEVEL OF A STORAGE CONTAINER OF A ROLLER MILL

The invention relates to an inlet arrangement for a roller mill, a control unit for an inlet arrangement and a roller mill with an inlet arrangement according to the invention. The invention further relates to a method for determining the level of milling material land controlling the level of milling material of a storage container of a roller mill.

In prior art roller mills, upstream the respective milling passage the milling material is fed to a storage container, e.g. by gravity, and accumulated there. The milling material is then metered with the aid of a discharge device, e.g. a feed roller, and conveyed into the milling gap.

At the beginning of the milling process, the fill level of the storage container is first set manually, e.g. by an operator, as the target level. It must be taken into account that, on the one hand, sufficient free buffer volume is available (level as low as possible), but on the other hand, the milling material can be dosed over the entire length of the rollers (level as high as possible).

A measuring device (e.g. force transducer) detects a deviation of the actual level from the target level during operation. A control device ensures that the discharge is adjusted so that the actual level corresponds as closely as possible to the target level. Force transducers have the disadvantage that the level of the milling material is not measured directly, but in-directly, and thus a calibration must be carried out, which is highly dependent on the properties of the material to be milled, in particular the density of the material to be milled.

The disadvantage of such measuring arrangements is that the actual level measured by the measuring device may not correspond to the actual fill level of the storage container. The operator must therefore always check manually the actual fill level and make a correction to the actual level determined.

It is therefore the problem of the present invention to provide an inlet arrangement for a roller mill, a control unit for an inlet arrangement, a roller mill and a method for determining the fill level of a storage container, which avoid the disadvantages of the known art and, in particular, enable a simple, inexpensive and automatic fill level determination of the storage container.

The problem is solved by an inlet arrangement, a control unit, a roller mill and a method with the features of the independent claims.

It should be noted at this point that, for the purposes of the present invention, a roller mill means a roller arrangement which can be used not only in the milling industry but also for other foodstuffs and animal feed.

The inlet arrangement comprises a storage container with at least one milling material inlet and at least one milling material outlet.

The inlet arrangement further comprises at least one metering device arranged on the storage container for metering milling material into a milling gap of the roller mill through the milling material outlet.

The dosing device can simply be designed as a gap, wherein the discharge quantity can be adjusted, if necessary, by changing a gap width, e.g. with the aid of a throttle valve. The dosing device may further comprise other elements which, for example, support the distribution of milling material in the storage container. These may comprise, for example, a conveying device such as a paddle or worm shaft. The metering device may also comprise a feed roller, which is designed to convey the milling material from the milling material outlet to the milling gap of the roller mill.

The dosing device can either be connected downstream of the storage container, i.e. arranged between the milling gap and the storage container. Alternatively or additionally, it can be provided that the dosing device is connected upstream of the storage container so that the quantity of the milling material that is conveyed into the storage container can be dosed.

A force transducer is arranged on the storage container to determine a weight force exerted by the material to be milled.

A level sensor is also arranged on the storage container to determine when a milling material level has been reached.

The level sensor thus provides a true value as to whether the fill level in the storage container has reached the milling material level and, if so, exceeds it or not.

The force transducer and/or level sensor can be arranged outside or inside the storage container. For example, the storage container can be connected to a force transducer, for example suspended from a force transducer or mounted on a force transducer. According to the invention, it is only necessary that a weight force exerted by the milling material in the storage container and the attainment of a milling material level can be determined.

Preferably, the level sensor is arranged in the storage container, especially preferably in the upper half of the storage container.

Preferably, the force transducer is arranged in the storage container, especially preferably in a lower region of the storage container.

This means that the force transducer is arranged in such a way that a weight force can be determined when the fill level of the storage container is low, and that the milling material does not reach the level sensor until the storage container has been filled to at least half its capacity.

The inlet arrangement further comprises a control unit which is connected or connectable to the force transducer and the level sensor.

The control unit can be a dedicated control unit of the inlet arrangement, which is connected to a higher-level control unit, for example of a roller mill. This is particularly advantageous if the inlet arrangement is intended for retrofitting existing roller mills. Alternatively, the control unit can be implemented in a higher-level control unit, for example in the control unit of a roller mill or in a plant control system.

According to the invention, the control unit is designed to determine a first fill level of the storage container from the weight force determined by the force transducer.

The control unit is also designed to determine a characteristic fill level curve based on the determined first fill level and the milling material level determined by the level sensor.

The first fill level is preferably a predetermined fill level corresponding to the height where the force transducer is mounted.

As mentioned at the beginning, the fill level determined with the help of the force transducer depends on many factors, in particular on a milling material density.

The control unit can thus first make an initial statement about the fill level of the storage container, since a determination of a weight force means that milling material is present in the storage container and, if the force transducer is arranged in the storage container, that the force transducer is loaded with milling material.

Alternatively, since the determined weight correlates with a fill level, any fill level can be used and, for example, a preliminary fill level curve and the weight force-fill level correlation can be used to determine a preliminary first fill level.

The preliminary fill level curve can be determined using only the measured weight force. Alternatively, it can be provided that the operator can enter parameters concerning the milling material, such as the degree of milling of the milling material, the roller gap width of the upstream passage, etc., which are used to determine the preliminary fill level curve.

The level sensor also determines whether the milling material has reached a certain level or not.

Based thereupon, the control unit can determine a characteristic fill level curve in a simple way, preferably by interpolation and/or extrapolation, using the fill level reached and the first fill level.

In the characteristic fill level curve, a weight force value is respectively assigned to a fill level value.

This means that the manual adjustment between the measured actual level and the actual fill level can be omitted, as this is now carried out by the control unit.

The characteristic fill level curve is preferably determined when the milling material level is reached. Particularly preferably, the characteristic fill level curve is also determined for fill levels that are higher than the milling material level.

In particular, the control unit can be designed in such a way that a characteristic fill level curve is determined anew each time the milling material level is reached. If the fill level decreases below the milling material level, the characteristic fill level curve continues to be used, wherein a new characteristic curve is determined if the fill level increases and the milling material level is reached again.

Furthermore, it can be provided, alternatively or additionally, that the characteristic fill level curve is also determined anew when the fill level drops below the milling material level. When the fill level decreases, the fill level sensor can be used to determine if the fill level falls below the milling material level and thus to determine the characteristic fill level curve.

In this sense, according to the present invention, "reaching a milling material level" means reaching the milling material level when the fill level increases and/or falling below the milling material level when the fill level decreases.

Preferably, the control unit is further adapted to determine, after the determination of the characteristic fill level curve, a second fill level based on a determined weight force and the characteristic fill level curve.

This can improve the accuracy of the fill level determination, as each weight force value is assigned to a fill level value by virtue of the characteristic fill level curve.

Preferably, a vertical distance between the force transducer and the level sensor is between 20 and 80 cm, more preferably between 40 and 60 cm.

Preferably, the level sensor is designed as a capacitive sensor. A capacitive sensor is a particularly simple, robust and cost-effective way of determining the fill level.

The invention also relates to a control unit for an inlet arrangement of a roller mill. All the advantages and further developments of the inlet arrangement described above are thus also applicable to a control unit according to the invention.

The control unit is connected or connectable to a force transducer arranged on the storage container for determining a weight force exerted by the milling material, and to a fill level sensor arranged on the storage container for determining when a milling material level has been reached in the storage container.

The control unit is also designed to determine a first fill level of the storage container from the weight force determined by the force transducer, and to determine a characteristic fill level curve based on the determined first fill level and the milling material level determined by the level sensor.

The invention also relates to a roller mill with an inlet arrangement according to the invention. All the advantages and further developments of the inlet arrangement described above are thus also applicable to a roller mill according to the invention.

The roller mill comprises at least two rollers defining a roller gap for milling of milling material, the roller gap being sup-plied with milling material from the milling material outlet of the inlet arrangement.

The invention also relates to a method for determining the filling level of a storage container for milling material of a roller mill. All the advantages and further developments of the inlet arrangement, the control unit and the roller mill described above are thus also applicable accordingly to a method according to the invention.

A storage container comprises at least one milling material inlet, at least one milling material outlet and at least one metering device for metering milling material into a milling gap of the roller mill through the milling material outlet.

The method according to the invention comprises the following steps:

First, a weight force exerted by the milling material is determined using a force transducer located on the storage container.

A first fill level of the storage container is then determined from the weight force determined by the force transducer.

A level sensor located on the storage container is used to determine when a milling material level has been reached in the storage container.

Subsequently, a characteristic fill level curve is determined based on the determined first fill level and the milling material level determined by the level sensor.

As mentioned above, the method according to the invention can thus be carried out with a simple sensor arrangement. The weight force determined by the force transducer correlates with a fill level of the storage container. A fill level can thus be determined via this correlation.

The level sensor also determines whether the milling material has reached a certain fill level or not.

Based on this, a characteristic fill level curve can be determined in a simple manner by determining a fill level curve with the aid of the fill level reached and the first fill level, preferably by interpolation and/or extrapolation.

The fill level curve is then used to determine a second fill level of the storage container with a weight force determined by the force transducer.

This means that the manual adjustment between the measured actual level and the actual fill level can be omitted, as this is now carried out by the control unit.

Figure 2:
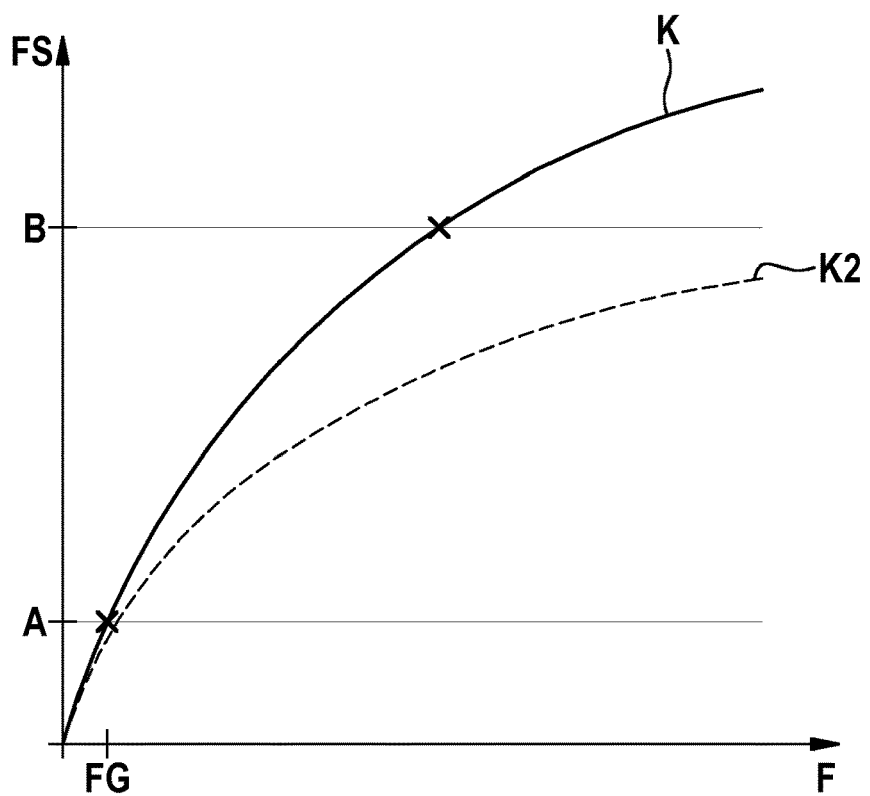

The invention is better described below with reference to a preferred embodiment in conjunction with the figures. It is shown:

FIG. 1 a schematic sectional view of the inlet arrangement according to the invention; and FIG. 2 schematic representation of a characteristic fill level curve.

FIG. 1 schematically shows an inlet arrangement 1. The inlet arrangement 1 comprises a storage container 2 with a milling material inlet 3 and a milling material outlet 4. A metering device 5 is also arranged at the milling material outlet 4, which is designed as a throttle valve. A gap width of the milling material outlet 4 can be changed by swiveling the throttle valve. A force transducer 6 is arranged on the storage container 2, which comprises an extension arm 9 that projects into the storage container 2 and can be designed, for example, as a bending beam.

When filling the storage container 2 with milling material, a cone of milling material is formed, which is shown schematically by the dotted line. As soon as the cone of milling material has reached the extension arm 9, the latter is loaded with a weight force FG. The control unit 8, which is connected to the force transducer 6 (shown schematically by the dotted line 10), thus detects that a first fill level A has been reached in the storage container.

When the storage container 2 is filled further, the cone of milling material and thus the fill level in the storage container increases. The increase in the fill level in the storage container 2 is detected by the control unit 8 by an increase in the weight force F determined by the force transducer 6. The control unit 8 can thus carry out a preliminary fill level determination using a preliminary characteristic fill level curve K2, which is shown dashed in FIG. 2.

When the cone of milling material has reached the level sensor 7, a signal is transmitted to the control unit 8 via the connection 11 (also shown schematically by the dashed line), which signals that a fill level corresponding to a milling material level B has been reached. The control unit 8 can thus use the first fill level A and the milling material level B to determine a characteristic fill level curve K, which is shown schematically in FIG. 2.

The fill level curve K (and analogously the preliminary fill level curve K2) correlates a measured weight force F (x-axis) to a fill level FS (y-axis). It can be seen from FIG. 2 that the fill level curve K can be used by the control unit 8 to determine a fill level FS of the storage container 2 for each weight force F determined by the force transducer 6, which fill level FS is more accurate than a fill level which can only be determined with the aid of the provisional fill level curve K2, because the fill level curve K has been calibrated by using the fill level B. Manual adjustment of the actual measured level with the actual fill level of the storage container 2 can thus be omitted.

The invention claimed is:

1. An inlet arrangement for a roller mill comprising:
   a storage container with at least one milling material inlet (3) and at least one milling material outlet,
   at least one metering device arranged in the storage container for metering a milling material into a milling gap of the roller mill through the milling material outlet,
   a force transducer arranged on the storage container for determining a weight force exerted by the milling material, and
   a control unit which is connected or connectable to the force transducer, wherein the inlet arrangement further comprises:
   a level sensor arranged on the storage container for determining when a milling material level is reached in the storage container,
   the control unit is connected or connectable to the level sensor,
   the control unit is designed to determine a first fill level of the storage container from the weight force determined by the force transducer, and the control unit is further designed to determine a characteristic fill level curve based on the determined first fill level and the milling material level determined by the level sensor.

2. The inlet arrangement according to claim 1, wherein the characteristic fill level curve is determined when the milling material level is reached.

3. The inlet arrangement according to claim 1, wherein the control unit is further designed to determine, after the determination of the characteristic fill level curve, a second fill level based on a determined weight force and the characteristic fill level curve.

4. The inlet arrangement according to claim 1, wherein a vertical distance between the force transducer and the level sensor is between 7.87 and 31.50 inches (20 and 80 cm).

5. The inlet arrangement according to claim 1, wherein the level sensor is a capacitive sensor.

6. The inlet arrangement according to claim 1, wherein the characteristic fill level curve is determined by one of interpolation and extrapolation.

7. The inlet arrangement according to claim 1, wherein the level sensor is arranged in the storage container.

8. The inlet arrangement according to claim 1, wherein the force transducer is arranged in the storage container.

9. The inlet arrangement according to claim 8, wherein the force transducer is arranged in a lower region of the storage container.

10. A control unit for an inlet arrangement with a storage container of a roller mill according to claim 1, wherein the control unit is connected or can be connected to the force transducer, arranged on the storage container, for determining the weight force exerted by the milling material, and to the level sensor, arranged on the storage container, for determining when the milling material level is reached in the storage container,
   wherein the control unit is further designed to determine the first fill level of the storage container from the weight force determined by the force transducer and to determine the characteristic fill level curve based on the determined first fill level and the milling material level determined by the level sensor.

11. A roller mill comprising at least two rollers defining a gap, wherein the roller mill further comprises an inlet arrangement according to claim 1.

12. A method for determining a level of a milling material in a storage container for the milling material of a roller mill, the storage container comprising at least one milling material inlet, at least one milling material outlet and at least one metering device for metering the milling material into a milling gap of the roller mill through the milling material outlet, the method comprising the following steps:
   determining a weight force exerted by the milling material with a force transducer arranged in the storage container,
   determining a first fill level of the storage container from the weight force determined by the force transducer,
   determining attainment of a milling material level in the storage container with a level sensor arranged in the storage container, and
   determining a characteristic fill level curve based on the determined first fill level and the milling material level determined by the level sensor.

13. The method according to claim 12, wherein the characteristic fill level curve is determined by one of interpolation and extrapolation.

* * * * *